March 21, 1950     E. F. MARTINET ET AL     2,500,955
AIRTIGHT TUBULAR COUPLING
Filed Oct. 13, 1948
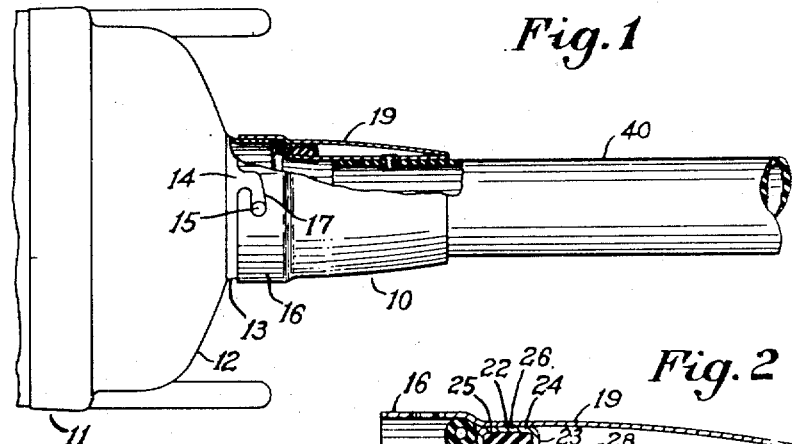
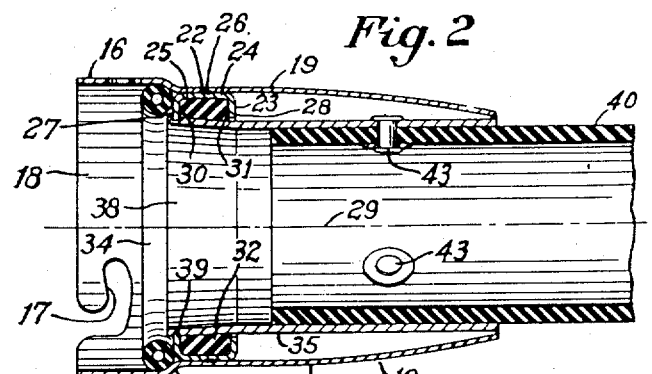
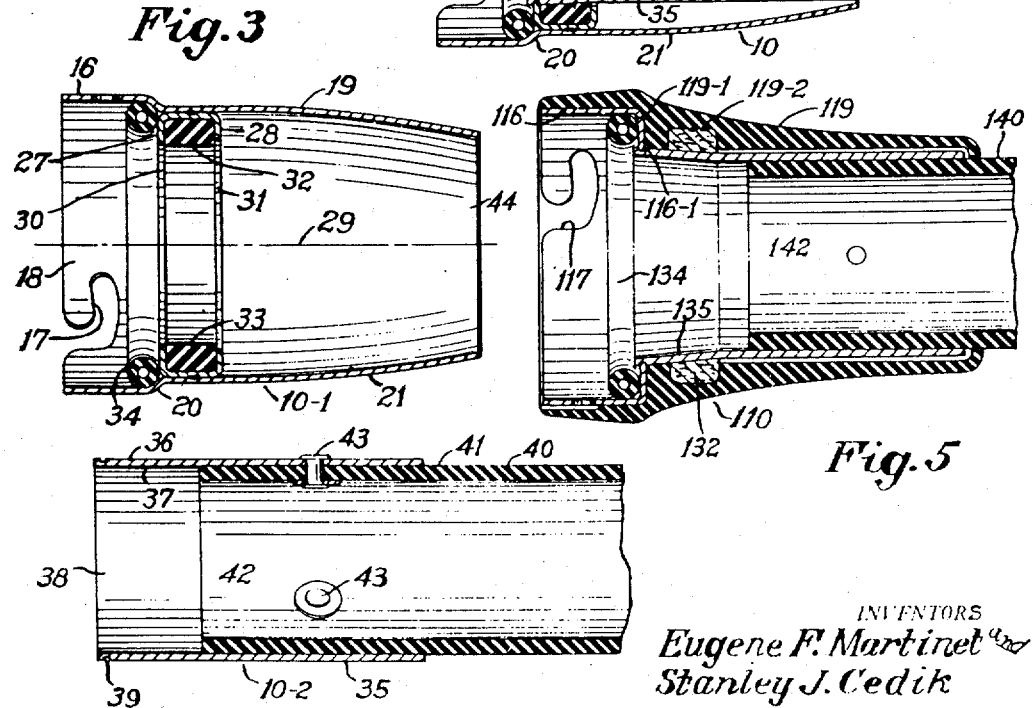
INVENTORS
Eugene F. Martinet and
Stanley J. Cedik
BY Frease & Bishop
ATTORNEYS Patented Mar. 21, 1950

2,500,955

UNITED STATES PATENT OFFICE 2,500,955

AIRTIGHT TUBULAR COUPLING

Eugene F. Martinet, Cleveland, and Stanley J. Cedik, Euclid, Ohio, assignors to The P. A. Geier Company, Cleveland, Ohio, a corporation of Ohio Application October 13, 1948, Serial No. 54,284

5 Claims. (Cl. 285—2)

The invention relates to airtight tubular couplings in general, and to airtight swiveling tubular couplings in particular, and more particularly to airtight swiveling tubular couplings adapted for use in suction cleaners of the tank or other type where separable swiveling airtight connections are desired between suction inlet or outlet ends of the cleaners and attachment hose, tubes, nozzles and the like.

Particularly, in tank type suction cleaners, recent improvements in fan and fan housing construction have increased the suction at the inlet end of the tanks to such an extent that usual forms of swiveling tubular couplings used to connect the inlet ends of the tanks with hose, tubes, nozzles and the like, prior to the present improvements, have been found to be ineffective, and to be subject to air leakage at the coupling.

The objects of the present invention or discovery include the provision of improved swiveling tubular couplings, particularly adapted for use in section cleaners of the tank type and in which their is substantially no air leakage.

Further objects of the present invention or discovery include the provision of an airtight swiveling tubular coupling having a simplified arrangement of parts, permitting economical manufacture, and convenience in use.

The foregoing and other objects are attained by the swiveling tubular couplings, parts, combinations, and subcombinations, which comprise the present invention or discovery and the nature of which is set forth in the following general statement, and preferred embodiments of which are set forth in the following description, and which are particularly and distinctly pointed out and set forth in the appended claims forming part hereof.

The nature of the improved swiveling tubular coupling of the present invention may be stated in general terms as including an outer tubular sleeve including walls forming an inwardly extending annular flange and an inwardly opening annular groove, an inner tubular sleeve telescoped within the outer tubular sleeve, the inner tubular sleeve having an outer surface formed with an outwardly opening groove, and the groove of the inner tubular sleeve swivel engaging the inner edge of the inwardly extending flange of the outer sleeve, an annular sealing gasket located in the inwardly opening groove of the outer sleeve and being in sealing abutment with a portion of the outer surface of the inner sleeve, and the outer sleeve having formed therein one or more bayonet joint connecting slots and having an annular shoulder spaced inwardly from the connecting slots, and an annular thrust gasket seated against the shoulder.

By way of example, embodiments of the improved swiveling tubular coupling of the present invention or discovery are illustrated in the accompanying drawings forming part hereof, in which:

Figure 1 is a fragmentary top plan view, with portions shown in section, of a horizontal tank type suction cleaner including one embodiment of the improved swiveling tubular coupling hereof;

Fig. 2 is an enlarged, detached longitudinal sectional view of the improved swiveling tubular coupling of Fig. 1;

Fig. 3 is a view similar to Fig. 2 showing the tank connecting sub-assembly of the coupling of Fig. 2;

Fig. 4 is a view similar to Figs. 2 and 3, showing the hose connecting sub-assembly of the coupling of Fig. 2, prior to being assembled with the tank connecting sub-assembly of Fig. 3; and Fig. 5, a view similar to Fig. 2, showing a second embodiment of the improved swiveling tubular coupling hereof.

Similar numerals refer to similar parts throughout the drawings.

In Figs. 1 to 4 inclusive, there is illustrated one embodiment indicated generally by 10 of the improved swiveling tubular coupling hereof, which in Fig. 1 is shown connected with a horizontal tank type suction cleaner indicated generally by 11, and which includes in combination with other usual tank type suction cleaner parts, a tank 12 having an annular inlet end 13, which has a cylindrical outer face 14 from which extend radially outwardly one or more bayonet joint lock pins 15.

The improved swiveling tubular coupling 10 includes an annular connector end 16 having formed therein one or more bayonet joint locking slots 17, and having an inner cylindrical face 18 adapted to telescopingly fit over the cylindrical outer face 14 of the annular end 13 of the suction cleaner tank 12, and adapted to rotate thereon for locking engagement of the slots 17 with the pins 15, as shown in Fig. 1.

The annular end 16 of the coupling 10, as shown and preferably is one end portion of an outer one-piece sleeve 19 formed of thin walled metal tubing. Intermediate the ends of the sleeve 19, there is formed a shoulder portion 20 extending inwardly from the inner end of the annular connector end portion 16, and from the inner end of the shoulder portion 20, there extends an elongated tapered tubular handle and cover portion 21.

The handle and cover portion 21 of the sleeve 19 includes a cylindrical inner face portion 22 adjacent the inner end of the shoulder portion 20, and a channel ring 23 includes a cylindrical web 24 having an outer cylindrical face 25 abutting the inner cylindrical face portion 22 of the handle and cover portion 21 of the sleeve 19. The channel 23 is preferably formed of sheet metal and has its web 24 connected to the handle and cover portion 21 of the sleeve 19 as by spot welds 26.

The channel 23 includes at one side an annular leg flange 27, and at the other side an annular leg flange 28, the channel leg flanges extending inwardly towards the longitudinal axis of the connector 10, indicated by the dot-dash line 29. The channel leg flange 27 is wider than the channel leg flange 28, and the channel leg flange 27 has an inner annular edge 30, and the channel leg flange 28 has an inner annular edge 31 offset radially outwardly from the inner edge 30.

In the inwardly opening groove of the channel 23, there is seated a sealing gasket 32 constituting an annular ring of resilient material such as rubber, and the sealing gasket 32 has an inner cylindrical face 33 which protrudes inwardly beyond the inner edges 30 and 31 of the channel leg flanges in the tank connecting sub-assembly 10—1 shown in Fig. 3, before assembly with the hose connecting sub-assembly 10—2 shown in Fig. 4. The tank connecting sub-assembly 10—1 also includes a thrust gasket 34 constituting an annular ring of resilient material such as rubber which may have a transversely cylindrical cross-section, and which is seated against the inner face of the outer sleeve shoulder portion 20 and the outer face of the channel leg 27.

The hose connecting sub-assembly 10—2 is shown in Fig. 4 before assembly with the tank connecting sub-assembly 10—1 and includes an inner cylindrical sleeve 35 having an outer cylindrical face 36 and an inner cylindrical face 37, and adjacent one end portion 38 of the inner sleeve 35 there is formed in its outer cylindrical face 36 an outwardly opening annular groove 39. A cylindrically tubular hose 40 has an outer cylindrical face 41 and one end 42 of the hose extends into the inner sleeve 35, the outer cylindrical face 41 of the hose 40 fitting the inner cylindrical face 37 of the sleeve 35, and the end 42 of the hose 40 being connected with the sleeve 35 as by rivets 43.

In assembling the hose connecting sub-assembly 10—2 with the tank connecting sub-assembly 10—1 to make the complete swiveling tubular coupling 10 as shown in Figs. 1 and 2, the sleeve 35 is inserted into the smaller end 44 of the handle and cover portion 21 of the outer sleeve 19, with the groove 39 aligned with the channel flange 27 and the end portion 38 of the inner sleeve 35 is expanded so as to engage the groove 39 with the inner edge 30 of the channel flange 27 providing a swiveling connection of the coupling inner sleeve 35 with the coupling outer sleeve 19. After the assembly of the complete swiveling tubular coupling 10, the annular resilient gasket 32 is compressed and forms an airtight seal between the outer sleeve 19 and the inner sleeve 35.

When the separable swiveling tubular coupling 10 is connected with the annular inlet end 13 of the suction cleaner 11 as shown in Fig. 1, the thrust gasket 34 is compressed in sealing the abutment with the end face of the annular inlet end 13.

In Fig. 5, there is illustrated a second embodiment indicated generally by 110 of the improved swiveling tubular coupling hereof, and which is functionally similar to the first embodiment 10, but which includes different materials and a different arrangement of certain parts. The swiveling tubular coupling 110 includes an annular connector end 116 which is formed of sheet metal and has an inwardly extending annular flange 116—1, and which has formed therein one or more bayonet joint locking slots 117. An outer sleeve 119 made of resilient material such as rubber has an outer counterbored annular socket 119—1 formed therein in which the flanged annular connector end 116 is seated. The outer sleeve 119 also has formed therein an inwardly opening annular groove 119—2 in which is seated an annular sealing gasket 132 made of resilient material such as felt as shown. An inner metal sleeve 135 has a swivel connection with the flange 116—1, similar to the swivel connection of the sleeve 35 with the flange 27 in the coupling 10. The sleeve 135 is connected with the telescoped end 142 of a hose 140.

The sealing gasket 132 provides an airtight seal between the outer sleeve 119 and the inner sleeve 135. A thrust gasket 134 similar to the thrust gasket 34 is seated in the socket 119—1.

In each of the swiveling tubular couplings 10 and 110, the construction and arrangement of the parts provide a freely swiveling and airtight coupling which prevents air leakage when connected with a suction cleaner such as the suction cleaner 11.

The embodiments of the present invention or discovery illustrated and described herein are by way of example, and the scope of the present invention is not limited to the same or to the particular details thereof, but is commensurate with any and all novel subject matter contained herein which may at any time properly under the patent laws be set forth in claims hereof or originating herein, the elements of any such claims being intended to include their reasonable equivalents.

We claim:

1. In a swiveling tubular coupling, an outer tubular sleeve including walls forming an inwardly extending annular flange and an inwardly opening annular groove, an inner tubular sleeve telescoped within the outer tubular sleeve, the inner tubular sleeve having an outer surface formed with an outwardly opening annular groove, and the groove of the inner tubular sleeve swivel engaging the inner edge of the inwardly extending flange of the outer sleeve, an annular sealing gasket located in the inwardly opening groove of the outer sleeve and the annular sealing gasket being in sealing abutment with a portion of the outer surface of the inner sleeve, and the outer sleeve having formed therein one or more bayonet joint connecting slots and having an annular shoulder spaced inwardly from the bayonet joint connecting slots, and an annular thrust gasket seated against the shoulder.

2. In a swiveling tubular coupling, an outer tubular sleeve including walls forming an inwardly extending annular flange and an inwardly opening annular groove, an inner tubular sleeve telescoped within the outer tubular sleeve, the inner tubular sleeve having an outer surface formed with an outwardly opening annular groove, and the groove of the inner tubular sleeve swivel engaging the inner edge of the inwardly extending flange of the outer sleeve, an annular sealing gasket located in the inwardly opening groove of the outer sleeve and the annular sealing gasket being in sealing abutment with a portion of the outer surface of the inner sleeve.

3. In a swiveling tubular coupling, an outer tubular sleeve, an annular channel located within the outer tubular sleeve, the annular channel including a web and spaced annular leg flanges at opposite sides of the web, one of the channel leg flanges being wider than the other, and means connecting the channel within the outer tubular sleeve and with the outer face of the channel in abutment with the inner face of the outer tubular sleeve, and the channel web and flanges forming an inwardly opening groove, an inner tubular sleeve telescoped within the outer tubular sleeve, the inner sleeve having an outer surface formed with an outwardly opening annular groove, and the groove of the inner tubular sleeve swivel engaging the inner edge of the wider channel leg flange, an annular sealing gasket in the inwardly opening groove of the channel and the annular sealing gasket being in sealing abutment with a portion of the outersurface of the inner sleeve, and the outer sleeve having formed therein one or more bayonet joint connecting slots and having an annular shoulder spaced inwardly from the bayonet joint connecting slots, and an annular thrust gasket seated against the shoulder.

4. In a swiveling tubular coupling, an outer tubular sleeve, an annular channel located within the outer tubular sleeve, the annular channel including a web and spaced annular leg flanges at opposite sides of the web, one of the channel leg flanges being wider than the other, and means connecting the channel within the outer tubular sleeve and with the outer face of the channel in abutment with the inner face of the outer tubular sleeve, and the channel web and flanges forming an inwardly opening groove, an inner tubular sleeve telescoped within the outer tubular sleeve, the inner sleeve having an outer surface formed with an outwardly opening annular groove, and the groove of the inner tubular sleeve swivel engaging the inner edge of the wider channel leg flange, an annular sealing gasket in the inwardly opening groove of the channel and the annular sealing gasket being in sealing abutment with a portion of the outer surface of the inner sleeve.

5. In a swiveling tubular coupling, an outer tubular sleeve including walls forming an inwardly extending annular flange and an inwardly opening annular groove, an inner tubular sleeve telescoped within the outer tubular sleeve, the inner tubular sleeve having an outer surface formed with an outwardly opening annular groove, and the groove of the inner tubular sleeve swivel engaging the inner edge of the inwardly extending flange of the outer sleeve, an annular sealing gasket located in the inwardly opening groove of the outer sleeve and the annular sealing gasket being in sealing abutment with a portion of the outer surface of the inner sleeve, and the outer sleeve having one or more joint engaging means and having an annular shoulder spaced inwardly from the joint engaging means, and an annular thrust gasket seated against the shoulder.

EUGENE F. MARTINET.
STANLEY J. CEDIK.

No references cited.